(12) United States Patent
Miki et al.

(10) Patent No.: US 8,897,281 B2
(45) Date of Patent: Nov. 25, 2014

(54) RADIO BASE STATION APPARATUS, MOBILE TERMINAL APPARATUS AND RADIO COMMUNICATION METHOD

(75) Inventors: Nobuhiko Miki, Kanagawa (JP); Yoshihisa Kishiyama, Kanagawa (JP); Satoshi Nagata, Kanagawa (JP); Mamoru Sawahashi, Kanagawa (JP)

(73) Assignee: NTT DoCoMo, Inc., Tokyo (JP)

(*) Notice: Subject to any disclaimer, the term of this patent is extended or adjusted under 35 U.S.C. 154(b) by 257 days.

(21) Appl. No.: 13/147,217

(22) PCT Filed: Jan. 29, 2010

(86) PCT No.: PCT/JP2010/051198
§ 371 (c)(1), (2), (4) Date: Nov. 14, 2011

(87) PCT Pub. No.: WO2010/090131
PCT Pub. Date: Aug. 12, 2010

(65) Prior Publication Data
US 2012/0044916 A1   Feb. 23, 2012

(30) Foreign Application Priority Data
Feb. 3, 2009   (JP) .................... 2009-023091

(51) Int. Cl.
*H04W 4/00*   (2009.01)
*H04L 5/00*   (2006.01)
*H04W 72/04*   (2009.01)

(52) U.S. Cl.
CPC .......... *H04L 5/0007* (2013.01); *H04W 72/042* (2013.01); *H04L 5/0053* (2013.01)
USPC .......... 370/338; 370/329; 370/328; 370/351; 370/336; 455/509; 375/295; 375/260; 375/316; 718/101; 718/102; 718/107

(58) Field of Classification Search
USPC ........................................ 370/338
See application file for complete search history.

(56) References Cited

U.S. PATENT DOCUMENTS 8,239,721 B2 *   8/2012   Pelletier et al. ............... 714/749
8,396,160 B2 *   3/2013   Kim et al. ...................... 375/295
(Continued)

FOREIGN PATENT DOCUMENTS

JP   2004-266585 A   9/2004
JP   2008-172355 A   7/2008
(Continued)

OTHER PUBLICATIONS

International Search Report w/translation from PCT/JP2010/051198 dated Feb. 23, 2010 (4 pages).
(Continued)

*Primary Examiner* — Faruk Hamza
*Assistant Examiner* — Shah R Zaman
(74) *Attorney, Agent, or Firm* — Osha Liang LLP

(57) ABSTRACT

Provided is a radio base station apparatus capable of transmitting a control signal efficiently even in radio communications using a system band that includes a plurality of component carriers. In the radio base station apparatus, control signals of transport blocks corresponding to the plural component carriers are coded jointly and the coded control signal is assigned to one or plural component carriers to be transmitted. A mobile terminal apparatus receives data from the radio base station apparatus, separates the control signal from the received data and decodes the separated control signal thereby to obtain control information of the transport blocks of the corresponding component carriers.

8 Claims, 14 Drawing Sheets

(56) References Cited

U.S. PATENT DOCUMENTS

| | | | |
|---|---|---|---|
| 2008/0307427 A1* | 12/2008 | Pi et al. .................... | 718/104 |
| 2009/0122752 A1 | 5/2009 | Nishio et al. | |
| 2009/0147866 A1 | 6/2009 | She et al. | |
| 2010/0296473 A1* | 11/2010 | Kim et al. ................ | 370/329 |
| 2010/0303011 A1* | 12/2010 | Pan et al. ................. | 370/328 |
| 2011/0299489 A1* | 12/2011 | Kim et al. ................ | 370/329 |

FOREIGN PATENT DOCUMENTS

| | | |
|---|---|---|
| JP | 2008-172356 A | 7/2008 |
| JP | 2008-172366 A | 7/2008 |
| WO | 2006/054697 A1 | 5/2006 |
| WO | 2007/052766 A1 | 5/2007 |
| WO | 2010013959 A2 | 2/2010 |
| WO | 2010048142 A1 | 4/2010 |

OTHER PUBLICATIONS

Espacenet abstract JP2008172366A dated Jul. 24, 2008 (1 page).

Espacenet abstract JP2008172356A dated Jul. 24, 2008 (1 page).

3GPP TR 25.912 V7.1.0; "3rd Generation Partnership Project; Technical Specification Group Radio Access Network; Feasibility Study for Evolved Universal Terrestrial Radio Access (UTRA) and Universal Terrestrial Radio Access Network (UTRAN) (Release 7)"; Sep. 2006 (57 pages).

Japanese Office Action for Application No. 2009-023091, mailed on Oct. 9, 2012 (8 pages).

Ericsson, "Control signaling for carrier aggregation" TSG-RAN WG1 #55bis; R1-090375; Ljubljana, Slovenia, Jan. 12-16, 2009, (3 pages).

CMCC, "Resource Allocation and PDCCH Design Issues in Carrier Aggregation"; 3GPP TSG-RAN WG1 #55bis; R1-090337; Ljubljana, Slovenia, Jan. 12-16, 2009; (6 pages).

Motorola, "Control Channel Design Issues for Carrier Aggregation in LTE-A"; 3GPP TSG RAN1#55bis; R1-090268; Ljubljana, Slovenia; Jan. 12-16, 2009; (3 pages).

NTT DOCOMO, "DL Layered Control Signal Structure in LTE-Advanced"; 3GPP TSG RAN WG1 Meeting #55bis; R1-090311; Ljubljana, Slovenia, Jan. 12-16, 2009; (7 pages).

Nokia, Nokia Siemens Networks; "Transport block mapping and DL control signalling in LTE-Advanced"; 3GPP TSG-RAN WG1 Meeting #55bis; R1-090233; Ljubljana, Slovenia; Jan. 12-16, 2009; (7 pages).

LG Electronics; "Considerations on DL/UL Transmission in Asymmetric Carrier Aggregation"; 3GPP TSG RAN WG1 Meeting #55bis; R1-090211; Ljubljana, Slovenia, Jan. 12-16, 2009; (5 pages).

Huawei; "PDCCH design for carrier aggregation"; 3GPP TSG RAN WG1#55bis; R1-090127; Ljubljana, Slovenia, Jan. 12-16, 2009; (5 pages).

Samsung; "PDCCH Structure for LTE-A"; 3GPP TSG RAN WG1 #55bis; R1-090095; Ljubljana, Slovenia, Jan. 14-18, 2009; (3 pages).

NTT DOCOMO, Inc., "UL Layered Control Signal Structure in LTE-Advanced"; 3GPP TSG RAN WG1 Meeting #54bis; R1-083679; Prague, Czech Republic, Sep. 29-Oct. 3, 2008; (14 pages).

Japanese Office Action for Application No. 2009-023091, mailed on Jul. 3, 2012 (4 pages).

* cited by examiner

| ATTRIBUTE | SEPARATE CODING | | JOINT CODING | | |
|---|---|---|---|---|---|
| | 1-STEP | 2-STEP | 1-STEP A (FIXED) | 1-STEP B (VARIABLE) | 2-STEP |
| OVERHEAD | LARGE | LARGE | MEDIUM | SMALL | SMALL |
| BLIND DETECTION | LARGE | SMALL | SMALL | LARGE | SMALL |
| FEEDBACK | PLURAL DTXs | PLURAL DTXs | SINGLE DTXs | SINGLE DTXs | SINGLE DTXs |

FIG. 4

| ATTRIBUTE | PDCCH TRANSMISSION OVER 1 CC | | PDCCH TRANSMISSION OVER PLURAL CCs | |
|---|---|---|---|---|
| | ALL CCs USED | SPECIFIC CCs USED | ALL CCs USED | SPECIFIC CCs USED |
| FREQUENCY DIVERSITY EFFECT | 20 MHz OR LESS | 20 MHz OR LESS | GREATER THAN 20 MHz | GREATER THAN 20 MHz |
| JOINT CODING EFECT | NO | YES | YES | YES |

FIG. 5

| NO. | PDCCH TRANSMISSION BAND | CC USED | CODING METHOD | STEPS |
|---|---|---|---|---|
| 1 | 1 CC | ALL CCs | SEPARATE | 1-STEP |
| 2 | | | | 2-STEP |
| 3 | | SPECIFIC CCs | JOINT | 1-STEP A |
| 4 | | | | 1-STEP B |
| 5 | | | | 2-STEP |
| 6 | PLURAL CCs | ALL CCs | JOINT | 1-STEP A |
| 7 | | | | 1-STEP B |
| 8 | | | | 2-STEP |
| 9 | | SPECIFIC CCs | JOINT | 1-STEP A |
| 10 | | | | 1-STEP B |
| 11 | | | | 2-STEP |

| Number of transport block | 1 | 2 | 3 | 4 | 5 |
|---|---|---|---|---|---|
| Resource allocation header | 1 | 2 | 3 | 4 | 5 |
| *Resource block assignment* | *25* | *50* | *75* | *100* | *125* |
| TPC command for PUCCH | 2 | 4 | 6 | 8 | 10 |
| HARQ process number | 3 | 6 | 9 | 12 | 15 |
| Transport block to codeword swap flag | 1 | 2 | 3 | 4 | 5 |
| Modulation and coding scheme | 10 | 20 | 30 | 40 | 50 |
| New data indicator | 2 | 4 | 6 | 8 | 10 |
| Redundancy version | 4 | 8 | 12 | 16 | 20 |
| Precoring imfomation | 3 | 6 | 9 | 12 | 15 |
| *CRC* | *16* | *32* | *48* | *64* | *80* |
| Total | 67 | 134 | 201 | 268 | 335 |

(b)

| Number of transport block | 1 | 2 | 3 | 4 | 5 |
|---|---|---|---|---|---|
| Resource allocation header | 4 | 5 | 5 | 4 | 1 |
| *Resource block assignment* | *25* | *26* | *39* | *52* | *65* |
| TPC command for PUCCH | 2 | 2 | 2 | 2 | 2 |
| HARQ process number | 3 | 6 | 9 | 12 | 15 |
| Transport block to codeword swap flag | 1 | 2 | 3 | 4 | 5 |
| Modulation and coding scheme | 10 | 20 | 30 | 40 | 50 |
| New data indicator | 2 | 4 | 6 | 8 | 10 |
| Redundancy version | 4 | 8 | 12 | 16 | 20 |
| Precoring imfomation | 3 | 6 | 9 | 12 | 15 |
| *CRC* | *16* | *16* | *16* | *16* | *16* |
| Total | 70 | 95 | 131 | 166 | 199 |

FIG. 14

RADIO BASE STATION APPARATUS, MOBILE TERMINAL APPARATUS AND RADIO COMMUNICATION METHOD

TECHNICAL FIELD

The present invention relates to a radio base station apparatus, a mobile terminal apparatus and a radio communication method in a next-generation mobile communication system.

BACKGROUND ART

In UMTS (Universal Mobile Telecommunication System) network, for the purpose of improving the frequency use efficiency and enhancing data rates, HSDPA (High Speed Downlink Packet Access) and HSUPA (High Speed Uplink Packet Access) have been adopted to make the best use of the features of W-CDMA-based system. In this UMTS network, LTE (Long Term Evolution) has been considered for further more enhanced data rates and lower delay (for example, see Non-Patent Literature 1). This LTE system uses, as a multiplexing system, OFDMA (Orthogonal Frequency Division Multiple Access) for the downlink and SC-FDMA (Single Carrier Frequency Division Multiple Access) for the uplink.

In the LTE system, when receiving a signal from a radio base station apparatus, a mobile terminal apparatus demodulates a control signal addressed to itself and controls with use of transmission power control information and scheduling information contained in the control signal. In this case, the mobile terminal apparatus demaps a signal that is mapped to a frequency area within a system band of each system and demodulates the demapped signal, and then, determines whether the signal is addressed to itself or not (blind decoding). Then, it transmits and receives a shared data channel signal in accordance with radio resource allocation information contained in the control signal addressed to itself.

In the $3^{rd}$-generation system, generally, the transfer rate of about 2 Mbps at the maximum can be realized for the downlink with use of a 5 MHz fixed band. Meanwhile, in the LTE system, the downlink transfer rate of about 300 Mbps at the maximum and the uplink transfer rate of about 75 Mbps can be realized with use of a variable band of 1.4 MHz to 20 MHz. Besides, in the UMTS network, in order to achieve further broader bands and higher speeds, LTE's successor system has been considered (for example, LTE-A (LTE-Advanced)). In this LTE-A system, for example, the LTE's maximum system band of 20 MHz can be expanded to about 100 MHz.

CITATION LIST

Non Patent Literature

NPL1: 3GPP, TR25.912 (V7.1.0), "Feasibility study for Evolved UTRA and UTRAN", September 2006

In the above-mentioned LTE-A system, it is planned to use a system band containing a plurality of component carriers (CC) in radio communications, in which each component carrier is the LTE's system band and also one band unit for the LTE-A system. However, there is no specification as to the transmitting and coding methods of control information in such radio communications over a system band containing plural component carriers. These transmitting and coding methods of control information need to be determined in consideration of the information transmission efficiency in the system.

The present invention was carried out in view of the foregoing, and has an object to provide a radio base station apparatus, a mobile terminal apparatus and a radio communication method, capable of transmitting control signals efficiently even in radio communication over a system band that includes a plural component carriers.

SUMMARY OF THE INVENTION

A radio base station apparatus according to the present invention is characterized by comprising: coding section configured to code control signals regarding transport blocks corresponding to a plurality of component carriers jointly; and transmitting section configured to assign a coded control signal coded by the coding means to one or plural component carriers and to transmit the coded control signal.

A mobile terminal apparatus according to the present invention is characterized by comprising: control signal separating section configured to separate a control signal from reception data received from a radio base station apparatus; and decoding section configured to decode the control signal to obtain control information of transport blocks corresponding to a plurality of component carriers.

According to the present invention, in the radio base station apparatus, control signals of transport blocks corresponding to plural component carriers are coded jointly, and a coded control signal is assigned to one or plural component carriers to be transmitted. In the mobile terminal apparatus, the coded control signal is separated from reception data received from the radio base station apparatus and the separated control signal is decoded to obtain control information of the transport blocks corresponding to the plural component carriers. This enables efficient transmission of the control signals even in radio communications over a system band that includes the plural component carriers.

BRIEF DESCRIPTION OF DRAWINGS

FIG. 4 is a view for explaining characteristics of the coding methods of PDCCHs in the base station according to the above-mentioned embodiment;

FIG. 5 is a view for explaining characteristics of the transmitting methods of PDCCHs in the base station according to the above-mentioned embodiment;

FIG. 6 is a view illustrating combinations of the transmitting and coding methods of PDCCHs used in the mobile communication system according to the above-mentioned embodiment;

FIGS. 14(a) and 14(b) are views illustrating examples of the number of control bits for PDCCHs in the separate coding and the joint coding in the mobile communication system according to the above-mentioned embodiment.

DESCRIPTION OF EMBODIMENTS

With reference to the attached drawings, an exemplary embodiment will be described in detail below.

Figure 1:
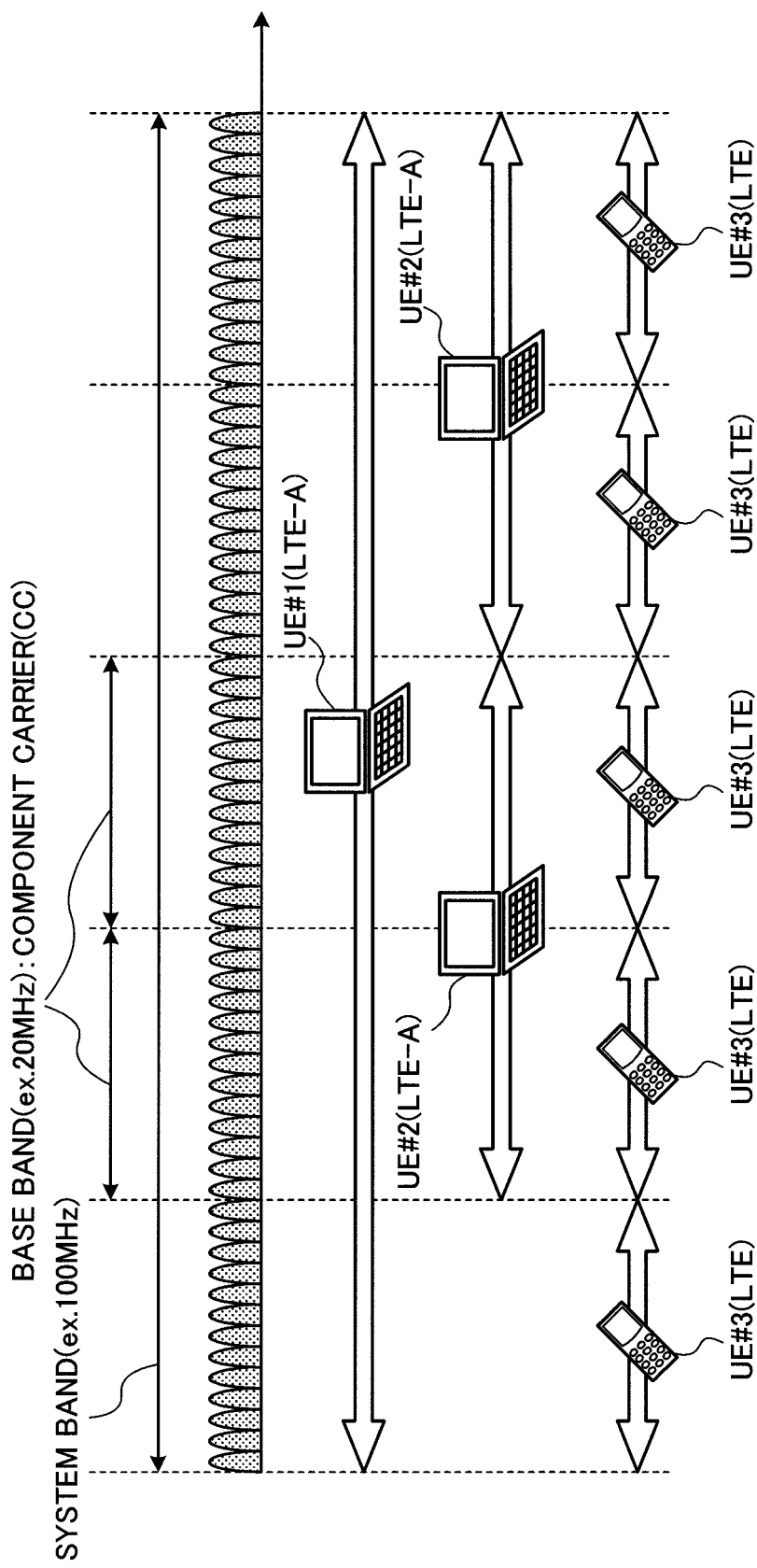
FIG. 1 is a view for explaining a state of use of frequencies in down-link mobile communications.

FIG. 1 is a view for explaining a state of use of frequencies in down-link mobile communications. The example illustrated in FIG. 1 shows the state of use of frequencies when an LTE-A system that consists of a plurality of component carriers and has a relatively wide system band and an LTE system that has a relatively narrow system band (consisting of one component carrier, here) are existed. In the LTE-A system, for example, radio communications are performed over a variable system bandwidth of 100 MHz or less and in the LTE system, radio communications are performed over a variable system bandwidth of 20 MHz or less. The system band of the LTE-A system has, as one band unit, at least one fundamental frequency area (CC: component carrier) of the system band of the LTE system. Thus, the plural fundamental frequency areas aggregate to be one wide area, which is called carrier aggregation.

For example, in FIG. 1, the system band of the LTE-A system has five component carrier bands (20 MHz×5=100 MHz) each of which is a component carrier of the LTE system band (base band: 20 MHz). In FIG. 1, a mobile terminal apparatus UE (User Equipment) #1 is a mobile terminal apparatus designed for the LTE-A system (also for the LTE system) and has a 100 MHz system band. The UE#2 is a mobile terminal apparatus designed for the LTE-A system (also for the LTE system) and has a 40 MHz system band (20 MHz× 2=40 MHz). The UE#3 is a mobile terminal apparatus designed for the LTE system (not for the LTE-A system) and has a 20 MHz system band (base band).

Thus, the system band of the LTE-A system includes, as one band unit, at least one frequency band of the system band of the LTE system, of which invention a patent application has been filed already by the applicant of the present application (Japanese Patent Application No. 2008-88103). Here, the LTE-A system does not need to use 100 MHz band for every mobile terminal apparatuses in mobile communications, and some mobile terminal apparatuses may use other system bands of less than 100 MHz, for example, 40 MHz bands in mobile communications.

In the LTE-A system and the LTE system, as the OFDMA is used in the downlink, transmission signals are mapped in frequency areas within the system band to be transmitted. Accordingly, in the LTE-A system, mapping is performed in a frequency area of 100 MHz or less bandwidth (five component carriers) and in the LTE system, mapping is performed in a frequency area of 20 MHz or less bandwidth (one component carrier). In both of the systems, it is supposed that the amount of information (number of bits) to be transmitted in the same sub frame is greatly different and the amount of information (number of bits) of control signals is also different accordingly. Here, in the LTE system, a control signal is mapped to first one to three OFDM symbols (IFFT (Inverse Fast Fourier Transform) unit).

The inventors of the present invention have focused attention on the above-mentioned point and made the present invention so as to transmit control signals efficiently. That is, the essence of the present invention is that in a radio base station apparatus (hereinafter referred to as "base station"), control signals of transport blocks corresponding to plural component carriers are coded jointly, a coded control signal is assigned to one or plural component carriers and transmitted, then, the control signal is separated from reception data received from the radio base station apparatus, the separated control signal is decoded to obtain control signals of the transport blocks corresponding to the plural component carriers and thereby efficient transmission of the control signals can be achieved even in radio communications using the system band including plural component carriers.

In the mobile communication system according to the present invention, in order to achieve efficient transmission of a control signal in radio communications using the system band that includes plural component carriers, specific combinations of coding and transmitting methods of control signals (PDCCHs) are utilized. As described in detail later, the transmitting method of PDCCHs includes the case i) where the PDCCHs are transmitted from one component carrier and the case ii) where the PDCCHs are transmitted from plural component carriers. Besides, the coding method of PDCCHs includes the case i) where the PDCCHs of transport blocks (PDCCHs in the blocks) corresponding to component carriers are coded on a component carrier-by-component carrier basis and the case ii) where the PDCCHs of transport blocks corresponding to plural component carriers are coded jointly. Here, the transport block means a data block as a retransmission unit of a transmission signal. Here, as the coding of the above-mentioned case i) means coding of a PDCCH corresponding to each component carrier, this coding is called "separate coding" for convenience' sake and as the coding of the above-mentioned case ii) means coding of PDCCHs corresponding to plural component carriers together, this coding is called "joint coding" for convenience' sake.

Figure 2:
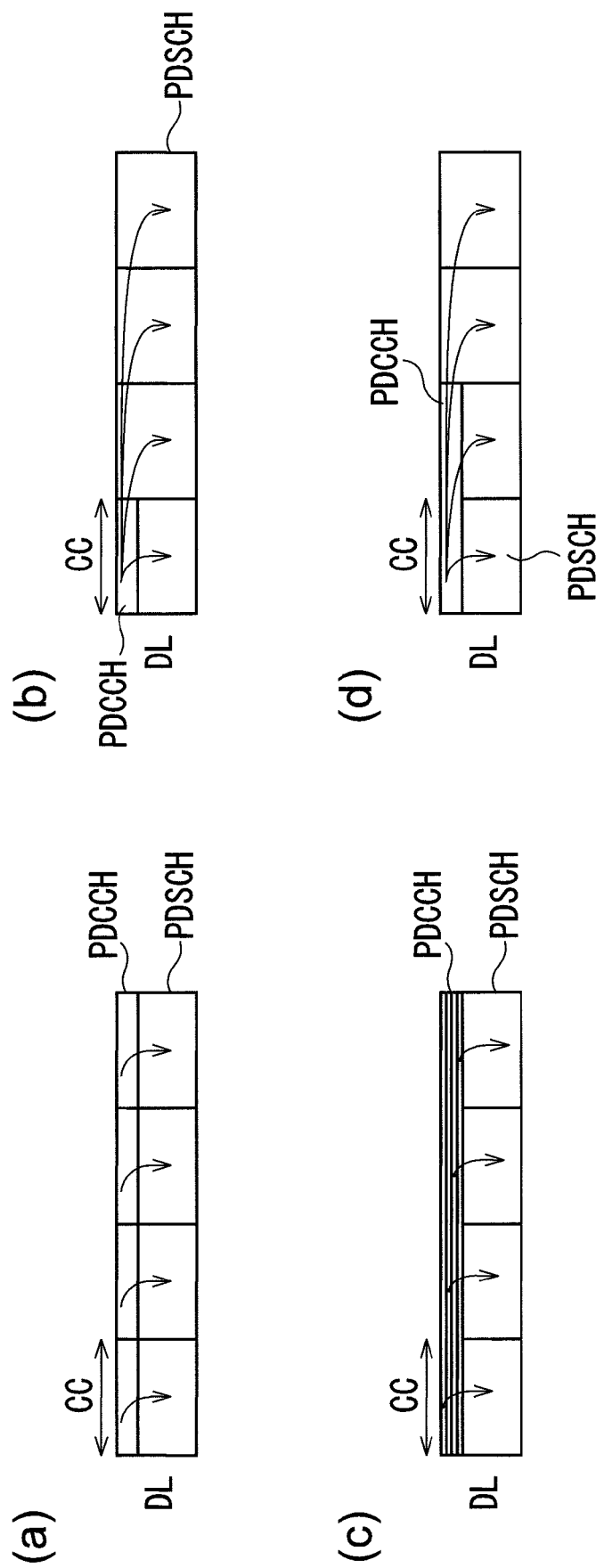
FIGS. 2(a) to 2(d) are schematic diagrams for explaining types of the transmitting method of PDCCHs in a base station of a mobile communication system according to an embodiment of the present invention.

The following description is made about types of the transmitting method of PDCCHs in the base station of the mobile communication system according to the present invention. FIGS. 2(a) to 2(d) are schematic diagrams for explaining types of the transmitting method of PDCCHs in the base station of the mobile communication system according to the embodiment of the present invention. Here, FIGS. 2(a) and 2(b) show the case i) of transmitting a PDCCH from one component carrier and FIGS. 2(c) and 2(d) show the case ii) of transmitting PDCCHs from plural component carriers. In FIGS. 2(a) to 2(d) (and FIGS. 3(a) to 3(e) described later), the system band has four component carriers, but this is intended not for limiting the present invention.

In FIG. 2(a), one PDCCH is transmitted from each component carrier and in each PDCCH, control information of a transport block corresponding to the component carrier to which the PDCCH belongs is specified. In FIG. 2(b), one or plural PDCCHs are transmitted from a specific single component carrier (primary carrier) and in these PDCCHs, control information of transport blocks corresponding to the plural component carriers are specified jointly.

In FIG. 2(c), a PDCCH covering the whole system band composed of plural component carriers is transmitted for each component carrier and each PDCCH has specific control information of a transport block corresponding to the component carrier. In FIG. 2(d), one PDCCH is transmitted from certain plural (two in this example) component carriers (primary carriers) and this PDCCH has specific control information of transport blocks corresponding to the plural component carriers.

Next description is made about types of the coding method of PDCCHs in the base station of the mobile communication system according to the present invention. FIGS. 3(a) to 3(e) are schematic diagrams for explaining the types of the coding method of PDCCHs in the base station of the mobile communication system according to the present embodiment. FIGS. 3(a) and 3(b) show the above-described case i) in which PDCCHs are coded on a component carrier-by-component carrier basis and FIGS. 3(c) to 3(e) show the above-described case ii) in which PDCCHs of plural component carriers are coded jointly.

Figure 3:
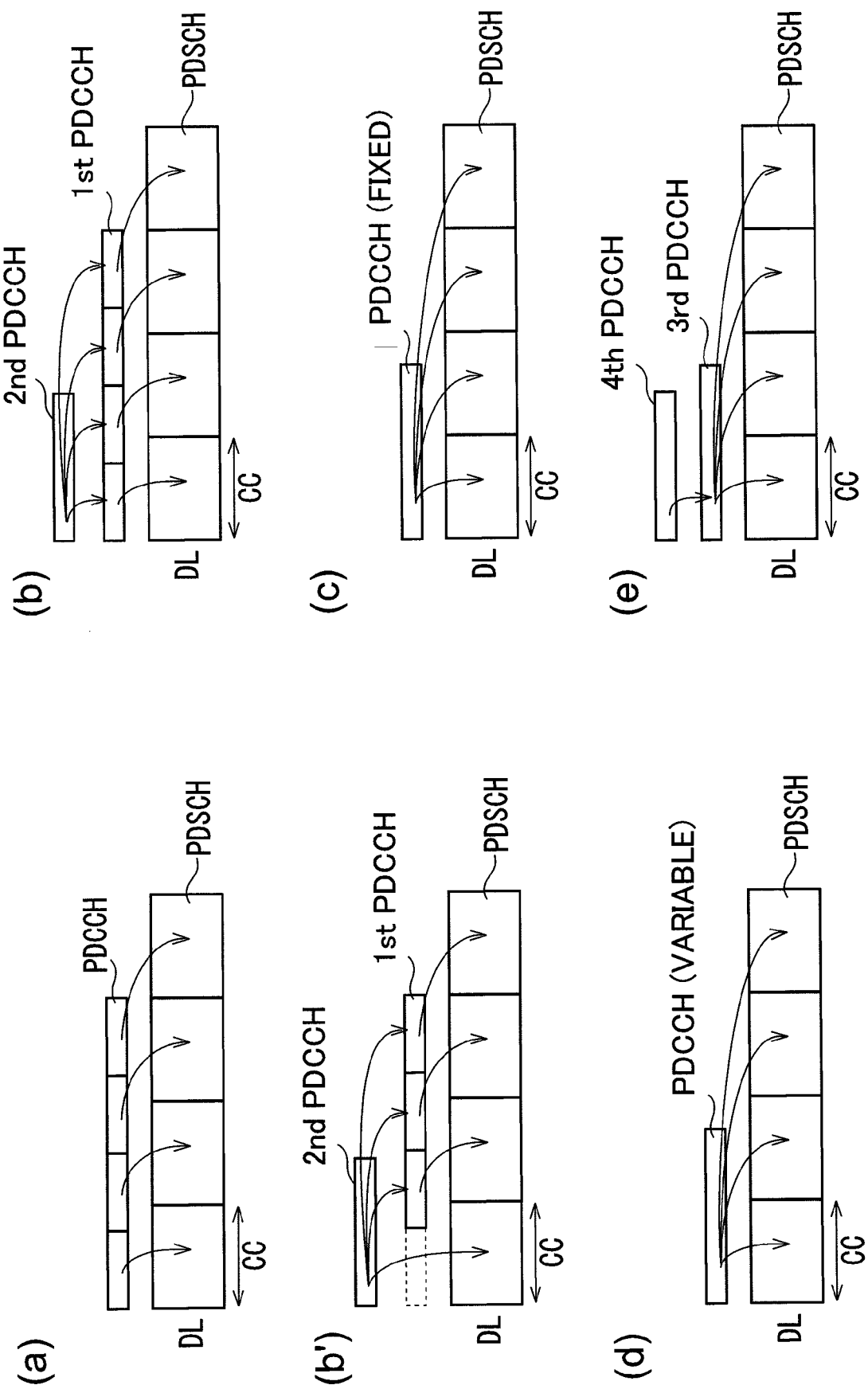
FIGS. 3(a) to 3(e) are schematic diagrams for explaining types of the coding method of PDCCHs in the base station of the mobile communication system according to the above-mentioned embodiment.

In FIG. 3(a), PDCCHs are coded on a component carrier-by-component carrier basis and each PDCCH is demodulated thereby to obtain control information of a transport block corresponding to the component carrier to which the PDCCH belongs. In FIG. 3(b), the PDCCHs (hereinafter referred to as "first PDCCHs" for convenience's sake) are coded on a component carrier-by-component carrier basis like in the FIG. 3(a) and a PDCCH (hereinafter referred to as "second PDCCH" for convenience's sake) for specifying the position of a component carrier to which each of the first PDCCHs is assigned is coded. After the second PDCCH is demodulated, the first PDCCH specified by the second PDCCH is demodulated and thereby to obtain the control information of the transport block of the component carrier to which the first PDCCH belong is obtained. Here, the second PDCCH serves to specify the positions of the component carriers to which the first PDCCHs are assigned, however, as illustrated in FIG. 3(b'), the second PDCCH may also have the function of the first PDCCH.

In the coding method of PDCCHs illustrated in FIG. 3(a), desired control information is obtained at one step in the mobile station, while in the coding method of PDCCHs illustrated in FIG. 3(b), desired control information is obtained at two steps in the mobile station. Accordingly, in the following description, the former is classified as one-step coding and the later is classified as two-step coding. In the coding method of PDCCHs shown in FIG. 3(b), the second PDCCH is assigned to a predetermined frequency band that is recognized in advance at the mobile station and its size (the number of constituent bits) is also recognized in advance in the mobile station. Therefore, in the mobile station, there is no need to detect the size of this second PDCCH in blind processing (hereinafter referred to as "blind detection" appropriately). In the mobile station, a signal of the frequency band (equivalent to the primary carrier) to which the second PDCCH is assigned is demodulated thereby to be able to recognize the first PDCCH assigned to the apparatus itself.

In FIGS. 3(c) and 3(d), PDCCHs are coded jointly corresponding to the plural component carriers and this PDCCH is demodulated thereby to obtain control information of related transport blocks corresponding to the component carriers. In the coding method shown in FIG. 3(c), a PDCCH is assigned to a predetermined frequency band that is recognized in advance by the mobile station and its size (the number of constituent bits) is also recognized in advance in the mobile station. In this case, the PDCCH has a fixed size and the number of bits is set so as to designate the control information of four transport blocks corresponding to four component carriers that make up the system band. Thus, as the PDCCHs are coded to be a PDCCH having the fixed size in accordance with the number of component carriers that make up the system band, the blind detection processing of the size of the PDCCHs in the mobile station can be eliminated. Here, the size of the PDCCH may be set in accordance with the number of transmission antennas and traffic.

Meanwhile, in the coding method illustrated in FIG. 3(d), the PDCCH has a variable size, which is set in accordance with control information of transport blocks corresponding to component carriers assigned to a mobile station as a communication target. In other words, when one transport block is assigned to the mobile station, the number of bits is set to specify the control information of the one transport block. When two transport blocks are assigned to the mobile station, the number of bits is set to specify the control information of the two transport blocks. In the coding method shown in FIG. 3(d), though the PDCCH is assigned to a predetermined frequency area recognized in advance in the mobile station, however, as the PDCCH is variable, it is necessary to perform blind detection of the size in the mobile station. Thus, as the PDCCH is coded to have a variable size in accordance with the number of transport blocks corresponding to the component carriers assigned to the mobile station, it is possible to prevent overhead of PDCCHs involved in information transmission.

In FIG. 3(e), like in FIG. 3(d), the variable-size PDCCH (hereinafter referred to as "third PDCCH" for convenience's sake) is coded and a PDCCH (hereinafter referred to as "fourth PDCCH" for convenience's sake) for specifying the size of this third PDCCH is coded. After the fourth PDCCH is demodulated, the third PDCCH specified by the fourth PDCCH is demodulated thereby to obtain control information of the transport blocks corresponding to the component carriers associated with the third PDCCH. That is, in FIG. 3(e), coding of the PDCCHs is performed including information for designating the size of the variable-size third PDCCH.

In the coding method of PDCCHs shown in FIGS. 3(c) and 3(d), the desired control information is obtained in the mobile station at one step, while in the coding method of PDCCHs shown in FIG. 3(e), the desired control information is obtained in the mobile station at two steps. In the following description, the former is classified as one-step coding and the later is classified as two-step coding. In the coding method of PDCCHs shown in FIG. 3(e), the fourth PDCCH is assigned to the predetermined frequency band that is recognized in advance in the mobile station and its size (the number of constituent bits) is also recognized in advance in the mobile station. Therefore, in the mobile station, it is not necessary to detect the size of this fourth PDCCH in the blind detection. Besides, as the size of the third PDCCH is recognized by demodulating the fourth PDCCH, the blind detection of the size of the third PDCCH can be also eliminated, unlike the coding method of FIG. 3(d).

Here, description is made about the characteristics of the coding methods of PDCCHs explained in FIGS. 3(a) to 3(e). FIG. 4 is a view for explaining the characteristics of the coding methods of PDCCHs in the base station according to the present exemplary embodiment. In FIG. 4, the coding methods of PDCCH are classified into the separate coding and the joint coding, each of which is classified into the one-step coding and the two-step coding. Besides, in FIG. 4, for convenience's sake, in the one-step coding of the joint coding, when the PDCCH has a fixed size, the step is called "one-step A" and when the PDCCH has a variable size, the step is called "one-step B".

As illustrated in FIG. 4, in the separate coding of PDCCHs, in terms of the overhead of the PDCCHs, as the PDCCHs are coded on a component carrier-by-component carrier basis, the overhead becomes large irrespective of the coding types of the one-step coding and two-step coding. Besides, in terms of the blind detection processing, in the one-step coding, as it is necessary to detect the PDCCHs of all of the component carriers in the blind detection processing, its amount of detection processing becomes large. Meanwhile, in the two-step coding, as there is no need to perform blind detection of the PDCCHs of all of the component carriers by demodulating the second PDCCH, its amount of detection processing becomes small. Further, in terms of the feedback of ACK/NACK in the uplink (UL), as the PDCCHs are coded on a component carrier-by-component carrier basis, it is necessary to perform DTX (Discontinuous Transmission) detection plural times in the base station irrespective of the coding types of the one-step coding and two-step coding. Here, the DTX detection is processing of detecting a state where the PDCCH cannot be detected at the mobile station and neither ACK nor NACK from the mobile station can be detected at the base station. In the separate coding, sometimes, only a part of the PDCCHs can be decoded correctly. Therefore, detection needs to be performed separately and the DTX detection needs to be performed plural times.

On the other hand, in the joint coding of PDCCHs, in terms of the overhead of PDCCHs, as the PDCCHs are coded jointly corresponding to the plural component carriers, the overhead becomes smaller than that of the separate coding. Particularly, in the one-step coding B, the PDCCH has a size corresponding to the transport blocks assigned to the mobile station, the overhead can be smaller. Meanwhile, in the one-step coding A, as the PDCCH has a size corresponding to the whole system band, the overhead cannot be reduced as compared with the one-step coding B. However, it can be smaller than that of the separate coding. Besides, as in the two-step coding, like in the one-step coding B, the third PDCCH has a size corresponding to the transport blocks assigned to the mobile station, the PDCCH overhead can be smaller.

In view of the blind detection processing, in the one-step coding A, as the fixed-sized PDCCH is to process, there is no need to perform blind detection of the size and the amount of detection processing becomes small. On the other hand, in the one-step coding B, the variable-size PDCCH is to process, its size needs to be subjected to blind detection, and the amount of detection processing becomes large. In the two-step coding, the variable-size PDCCH is to process, however, its size can be grasped by demodulating the fourth PDCCH. Therefore, there is no need to detect the size by blind detection and the amount of detection processing becomes small. In terms of the ACK/NACK feedback in the uplink (UL), as the PDCCHs are coded jointly corresponding to the plural component carriers, the DTX detection needs to be performed only once irrespective of the coding types of one-step coding and two-step coding.

Next description is made about the characteristics of the transmitting methods of PDCCHs explained in FIGS. 2(a) to 2(d). FIG. 5 is a view for explaining the characteristics of the transmitting methods of PDCCHs in the base station according to the present embodiment. In FIG. 5, the transmitting methods of PDCCHs are classified into the case of transmitting over one component carrier (PDCCH transmission over 1 CC) and the case of transmitting over plural component carriers (PDCCH transmission over plural CCs) and the cases are further classified into the case of transmitting PDCCHs overall component carriers (use of all CCs) and the case of transmitting PDCCHs over specific component carriers (use of specific CCs). In FIG. 5, appropriate coding is selected in accordance with a transmitting method type. Specifically, in the case of transmitting PDCCHs over one CC and using all CCs, the separate coding is selected. In other transmitting methods, the joint coding is selected.

As illustrated in FIG. 5, in transmitting PDCCHs over one CC, in terms of the frequency diversity effect, as the PDCCHs are associated with respective component carriers, the frequency diversity effect can be achieved within a range of 20 MHz at the maximum irrespective of the types of using all CCs or specific CCs. The effect obtained by the joint coding (for example, reduction in overhead and processing amount of blind detection) cannot be obtained when using all CCs as the joint coding is selected only in using specific CCs and the effect can be obtained in using the specific CCs.

Meanwhile, in transmitting PDCCHs over plural CCs, in terms of the frequency diversity effect, the PDCCHs are associated with plural component carriers, the frequency diversity effect can be achieved beyond the range of 20 MHz irrespective of the types of using all CCs or specific CCs. The effect obtained by the joint coding (for example, reduction in overhead and processing amount of blind detection) can be obtained as the joint coding is selected, irrespective of the types of using all CCs or specific CCs.

Among such coding and transmitting methods of PDCCHs, combinations illustrated in FIG. 6 are adopted in the mobile communication system according to the present embodiment. Particularly, in the mobile communication system according to the present embodiment, the most preferable combination is selected among them in view of a mobile station as a communication target. For example, when the mobile station as a communication target is a terminal that is designed only for the LTE system, combination No. 1 illustrated in FIG. 6 is selected. When the mobile station as a communication target is a terminal that is designed for the LTE-A system, combinations Nos. 6 to 11 are adopted. When the mobile station as a communication target is a terminal that is designed for the LTE system, combination No. 1 is used to enable communications of a control signal using an existing communication method (backward compatibility). Besides, when the mobile station as a communication target is a terminal compatible with the LTE-A system, combinations Nos. 6 to 11 are used to allow communications of control signals more effectively.

Combinations Nos. 1 to 5 illustrated in FIG. 6 denote the transmitting methods of transmitting PDCCHs over one component carrier (one CC). Out of these combinations, combinations Nos. 1 and 2 denote combinations of the separate coding of PDCCHs and transmission over all component carriers (all CCs). They are different in the number of steps in coding (combination No. 1 shows one-step coding and combination No. 2 shows two-step coding). Combinations Nos. 3 to 5 denote combinations of the joint coding of PDCCHs and transmission over specific component carriers (specific CCs). They are different in the number of coding steps (combination No. 3 shows one-step coding A, combination No. 4 shows one-step coding B and combination No. 5 shows two-step coding).

Combinations Nos. 6 to 11 denote the transmitting method of PDCCHs over plural component carriers (plural CCs). Out of these combinations, combinations Nos. 6 to 8 denote combinations of the joint coding of PDCCHs and transmitting over all component carriers (all CCs). They are different in number of coding steps (combination No. 6 shows one-step coding A, combination No. 7 shows one-step coding B and combination No. 8 shows two-step coding). Combinations Nos. 9 to 11 denotes combination of the joint coding of PDCCHs and transmitting over specific component carriers (specific CCs). They are different in the number of coding steps (combination No. 9 shows one-step coding A, combination No. 10 shows one-step coding B and combination No. 11 shows two-step coding).

Figure 7:
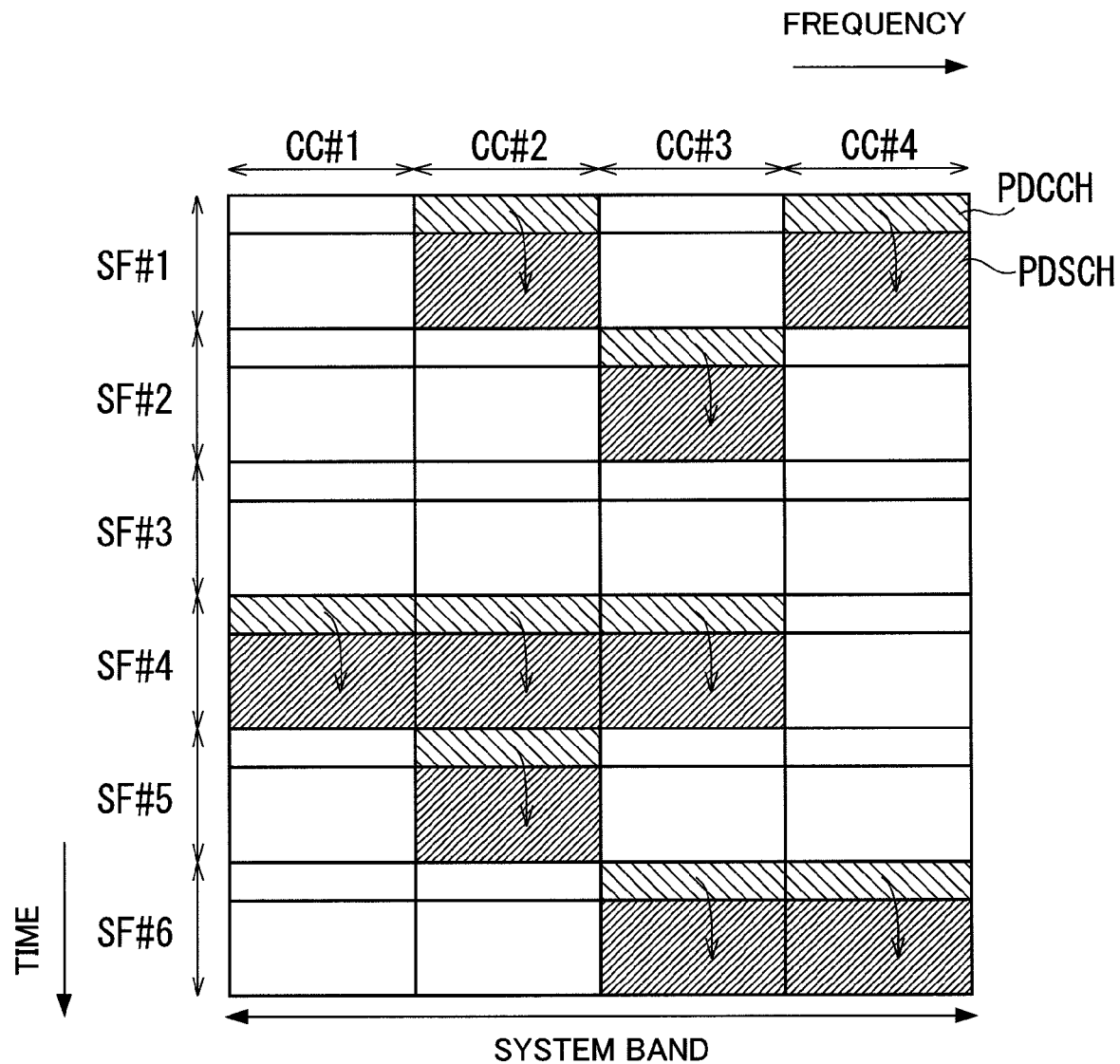
FIG. 7 is a view illustrating an example of a state of transmitting PDCCHs in accordance with the combinations Nos. 1 and 2 of FIG. 6.
Figure 8:
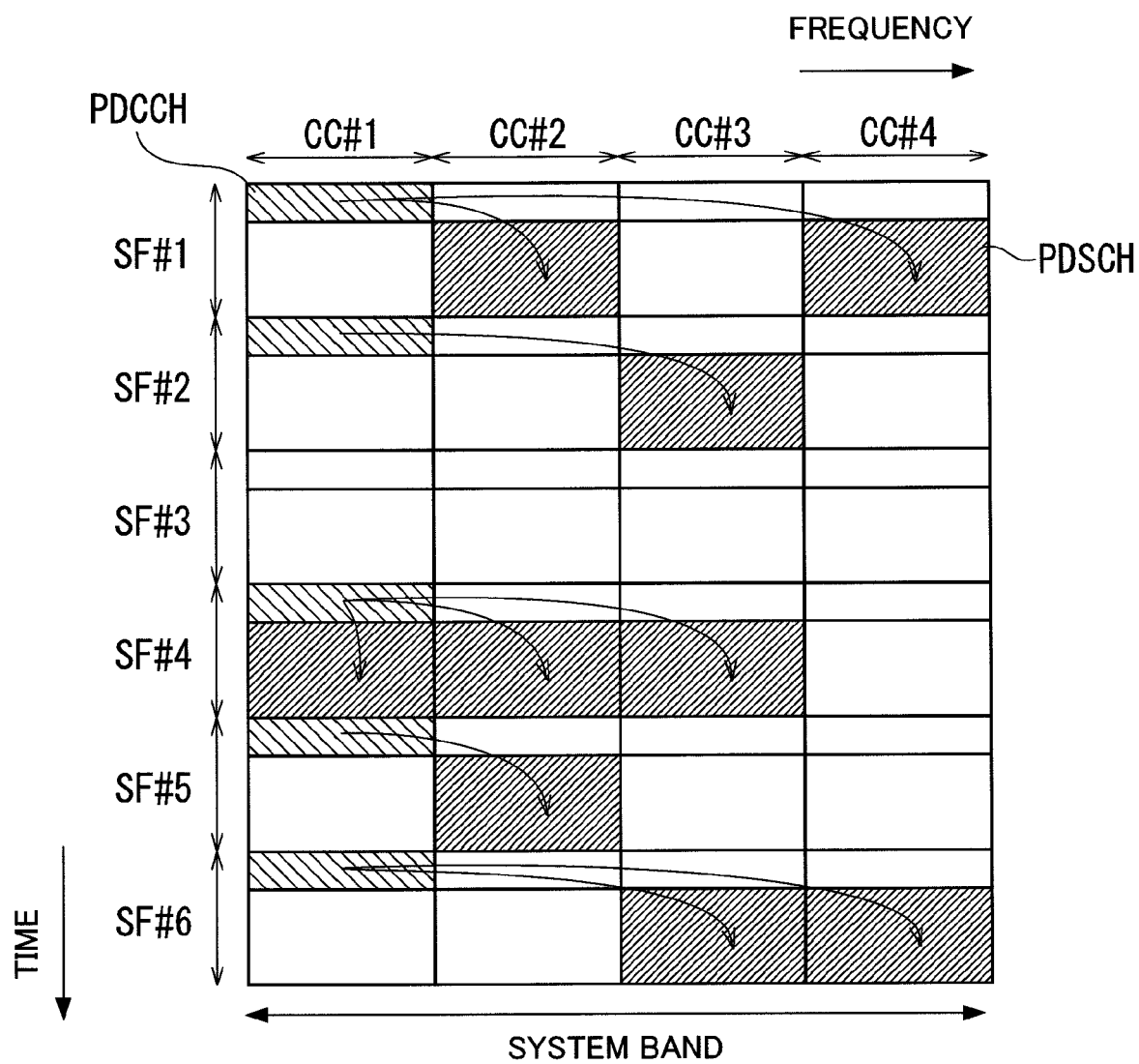
FIG. 8 is a view illustrating an example of a state of transmitting PDCCHs in accordance with the combinations Nos. 3 to 5 of FIG. 6.
Figure 9:
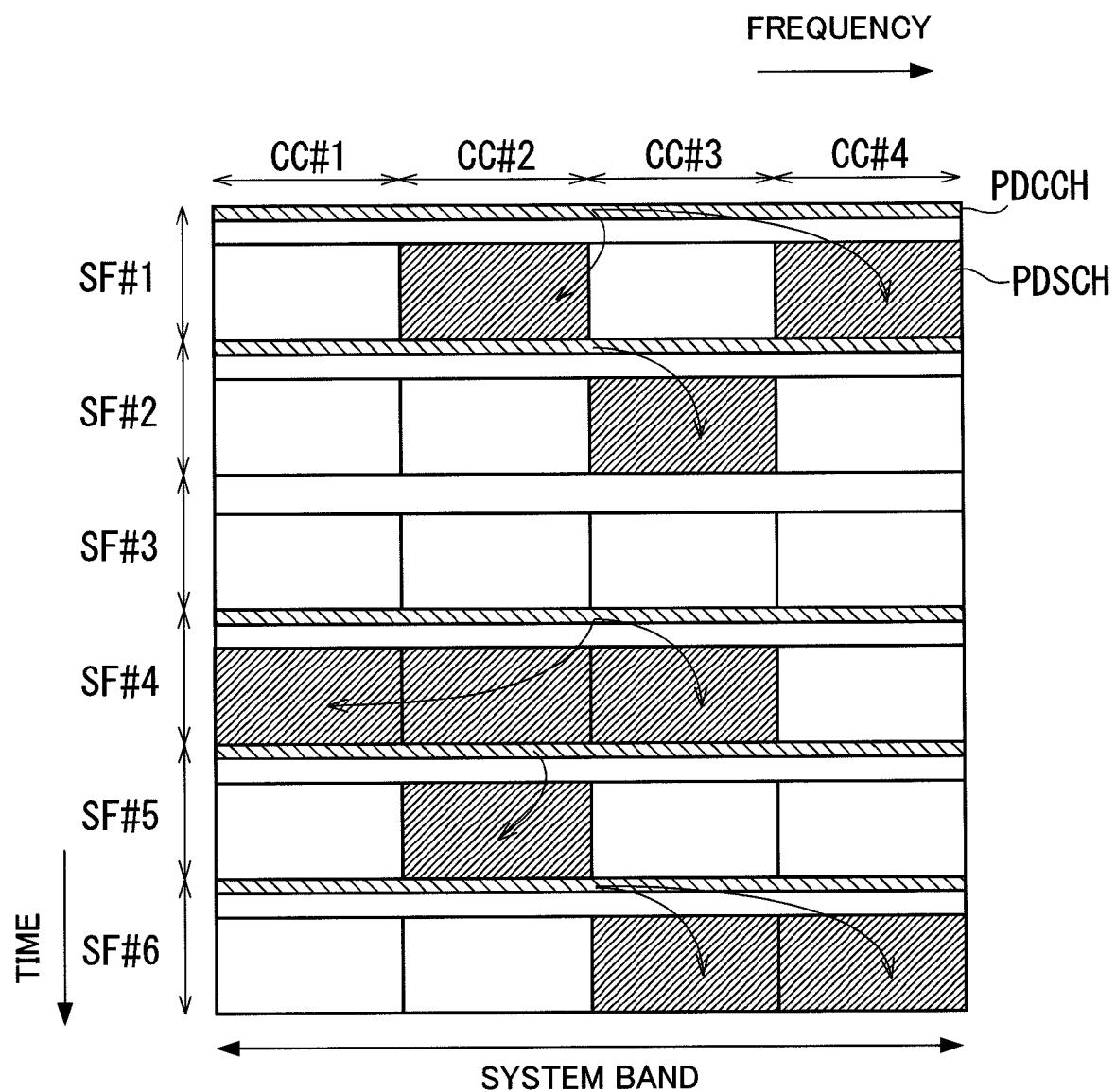
FIG. 9 is a view illustrating an example of a state of transmitting PDCCHs in accordance with the combinations Nos. 6 to 8 of FIG. 6.
Figure 10:
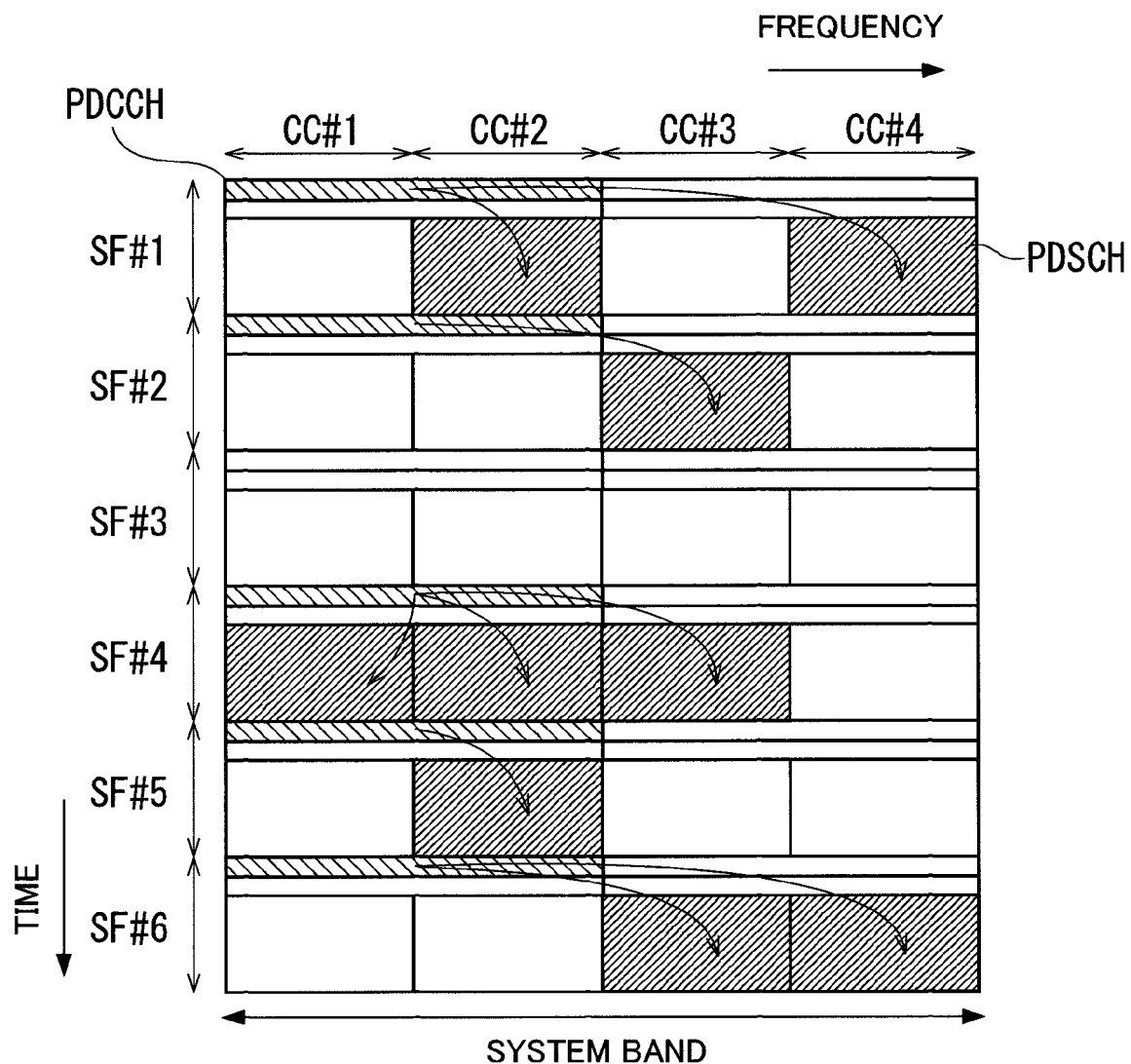
FIG. 10 is a view illustrating an example of a state of transmitting PDCCHs in accordance with the combinations Nos. 9 to 11 of FIG. 6.

The following description is made about the state of transmitting PDCCHs in combinations of transmitting methods and coding methods as illustrated in FIG. 6. FIGS. 7 to 10 are schematic diagrams for explaining the transmission state of PDCCHs when the transmitting method and coding method are combined as illustrated in FIG. 6. FIG. 7 illustrates an example of a state of transmitting PDCCHs in accordance with the combinations Nos. 1 and 2 of FIG. 6. FIG. 8 illustrates one example of a state of transmitting PDCCHs in accordance with the combinations Nos. 3 to 5 of FIG. 6. FIG. 9 illustrates one example of a state of transmitting PDCCHs in accordance with the combinations Nos. 6 to 8 of FIG. 6. FIG. 10 illustrates one example of a state of transmitting PDCCHs in accordance with the combinations Nos. 9 to 11 of FIG. 6.

Here, FIGS. 7 to 10 illustrate the system band consisting of four component carriers (hereinafter referred to as "CC" appropriately). Besides, in FIGS. 7 to 10, transport blocks (PDSCHs therein) for a certain mobile station are allocated to the CC#2 and CC#4 in the sub-frame (SF) #1, to CC#3 in the SF#2, to no CC in the SF#3, to CC#1 to CC#3 in the SF#4, to CC#2 in the SF#5 and to CC#3 and CC#4 in the SF#6.

In combination of transmitting PDCCHs over one CC, separate coding of PDCCHs and transmitting over all CCs, as illustrated in SF#1 of FIG. 7, control information of transport blocks of CC#2 and CC#4 for the mobile station is designated in the PDCCHs of the CC#2 and CC#4, respectively. In the same way, as illustrated in SF#4 of FIG. 7, the control information of the transport blocks of CC#1 to CC#3 for the mobile station is designated in the PDCCHs of the CC#1 to CC#3, respectively. Here, FIG. 7 illustrates the transmission state when the PDCCHs are subjected to the one-step coding. If the PDCCHs are subjected to the two-step coding, the PDCCHs illustrated in FIG. 7 are the above-described first PDCCHs and in addition to these first PDCCHs, the second PDCCH (not shown) is assigned to a predetermined frequency band that is recognized in advance in the mobile station.

In combination of transmitting PDCCHs over one CC, joint coding of PDCCHs and transmitting over specific CCs, as illustrated in the SF#1 of FIG. 8, control information of transport blocks of the CC#2 and CC#4 for the mobile station is specified by the PDCCH of CC#1 as the specific CC. For example, in the PDCCH of CC#1 in the SF#2, control information of the transport block of the CC#3 is specified, and in the PDCCH of the CC#1 in the SF#4, control information of the transport blocks of the CC#1 to CC#3 is specified. FIG. 8 illustrates the transmission state of one-step coding of the PDCCHs. If the PDCCHs are subjected to the two-step coding, the PDCCHs shown in FIG. 8 are the above-mentioned third PDCCH and in addition to this third PDCCH, the fourth PDCCH (not shown) is assigned to a predetermined frequency band that is recognized in advance in the mobile station.

In this case, the size of the PDCCH is different among the combinations Nos. 3 to 5 of FIG. 6. Taking the example of the SF#2, in the combination No. 3 using the one-step coding A, the size is a size for designating the control information of four transport blocks corresponding to four component carriers that make up the system band. In the combination No. 4 using the one-step coding B, the size is a size for designating the control information of one transport block corresponding to one component carrier assigned to the mobile station. Besides, in the combination No. 5 using the two-step coding, the size is a sum size of a size for designating the control information (third PDCCH) of the one transport block like in the combination No. 4 and a size for designating control information (fourth PDCCH) that designates the size of the third PDCCH. Taking the example of the SF#4, in the combination No. 3 using the one-step coding A, the size is a size for designating the control information of four transport blocks corresponding to four component carriers that make up the system band. In the combination No. 4 using the one-step coding B, the size is a size for designating the control information of three transport blocks corresponding to three component carriers assigned to the mobile station. Besides, in the combination No. 5 using the two-step coding, the size is a sum size of a size for designating the control information (third PDCCH) of the three transport blocks like in the combination No. 4 and a size for designating control information (fourth PDCCH) that designates the size of the third PDCCH.

In combination of transmitting PDCCHs over plural CCs, joint coding of PDCCHs and transmitting over all CCs, as illustrated in the SF#1 of FIG. 9, control information of transport blocks of the CC#2 and CC#4 for the mobile station is designated by the PDCCH that covers all the system band (CC#1 to CC#4). FIG. 9 illustrates the transmission state of one-step coding of the PDCCHs. If the PDCCHs are subjected to the two-step coding, the PDCCHs shown in FIG. 9 are the above-mentioned third PDCCH and in addition to this third PDCCH, the fourth PDCCH (not shown) is assigned to a predetermined frequency band that is recognized in advance in the mobile station.

In this case, the size of the PDCCHs is different among the combinations Nos. 6 to 8 of FIG. 6, like among the above-described combinations Nos. 3 to 5. That is, taking the example of the SF#2, in the combination No. 6 using the one-step coding A, the size is a size for designating the control information of four transport blocks. In the combination No. 7 using the one-step coding B, the size is a size for designating the control information of one transport block assigned to the mobile station. Besides, in the combination No. 8 using the two-step coding, the size is a sum size of a size for designating the control information (third PDCCH) of the one transport block like in the combination No. 7 and a size for designating control information (fourth PDCCH) that designates the size of the third PDCCH. Taking the example of the SF#4, in the combination No. 6 using the one-step coding A, the size is a size for designating the control information of four transport blocks. In the combination No. 7 using the one-step coding B, the size is a size for designating the control information of three transport blocks. Besides, in the combination No. 8 using the two-step coding, the size is a sum size of a size for designating the control information (third PDCCH) of the three transport blocks like in the combination No. 7 and a size for designating control information (fourth PDCCH) that designates the size of the third PDCCH.

In combination of transmitting PDCCHs over plural CCs, joint coding of PDCCHs and transmitting over specific CCs, as illustrated in the SF#1 of FIG. 10, control information of transport blocks of the CC#2 and CC#4 for the mobile station is designated by the PDCCH of the CC#1 and CC#2 as the specific CCs. FIG. 10 illustrates the transmission state of one-step coding of the PDCCHs. If the PDCCHs are subjected to the two-step coding, the PDCCHs shown in FIG. 10 are the above-mentioned third PDCCH and in addition to this third PDCCH, the fourth PDCCH (not shown) is assigned to a predetermined frequency band that is recognized in advance in the mobile station.

In this case, the size of the PDCCHs is different among the combinations Nos. 9 to 11 of FIG. 6, like among the above-described combinations Nos. 3 to 5 and Nos. 6 to 8. That is, taking the example of the SF#2, in the combination No. 9 using the one-step coding A, the size is a size for designating the control information of four transport blocks. In the combination No. 10 using the one-step coding B, the size is a size for designating the control information of one transport block assigned to the mobile station. Besides, in the combination No. 11 using the two-step coding, the size is a sum size of a size for designating the control information (third PDCCH) of the one transport block like in the combination No. 10 and a size for designating control information (fourth PDCCH) that designates the size and position of the third PDCCH. Taking the example of the SF#4, in the combination No. 9 using the one-step coding A, the size is a size for designating the control information of four transport blocks. In the combination No. 10 using the one-step coding B, the size is a size for designating the control information of three transport blocks. Besides, in the combination No. 11 using the two-step coding, the size is a sum size of a size for designating the control information (third PDCCH) of the three transport blocks like in the combination No. 10 and a size for designating control information (fourth PDCCH) that designates the size of the third PDCCH.

Figure 11:
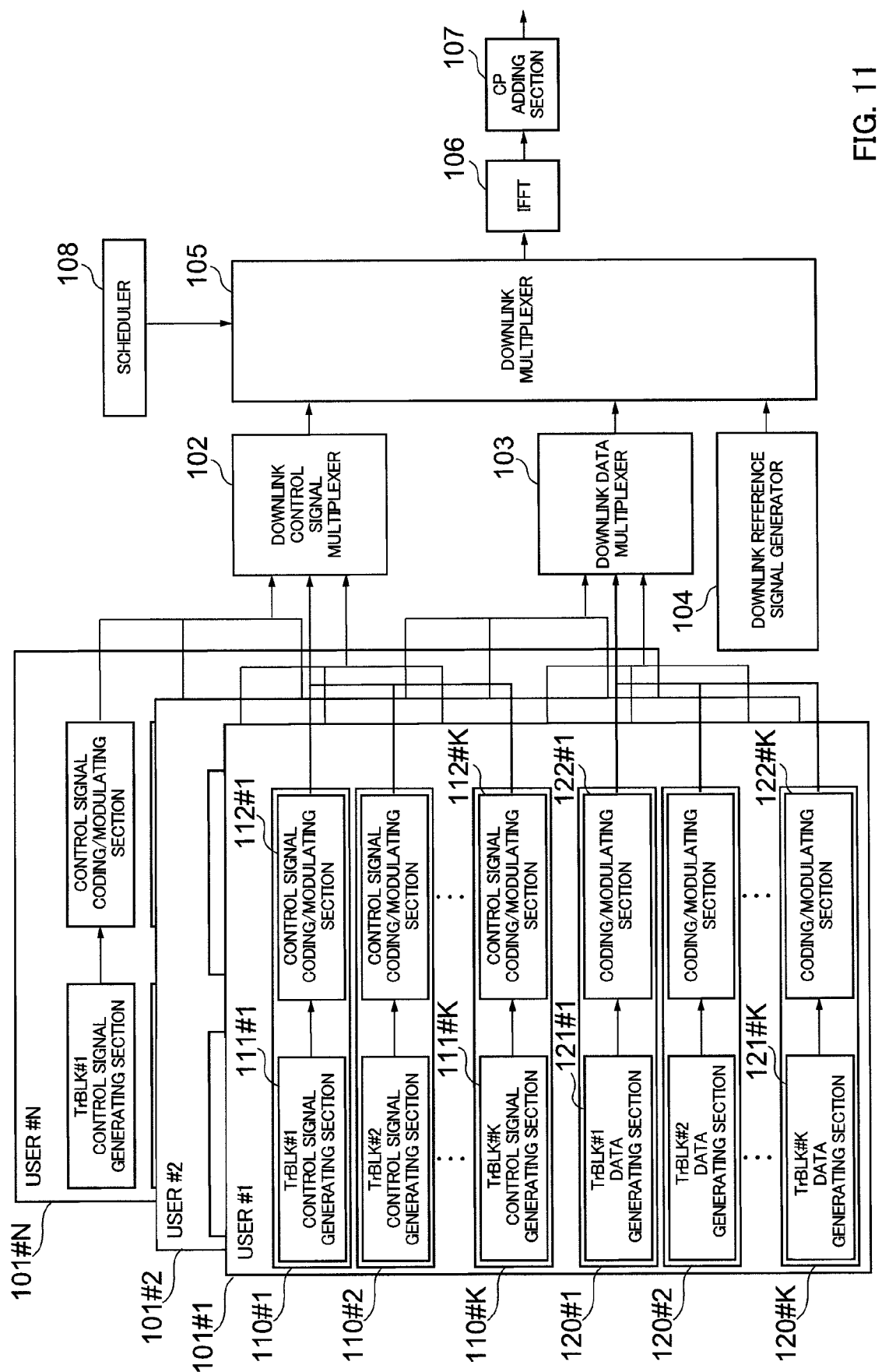
FIG. 11 is a block diagram illustrating a configuration of a transmitting unit of the base station according to the above-mentioned embodiment.
Figure 12:
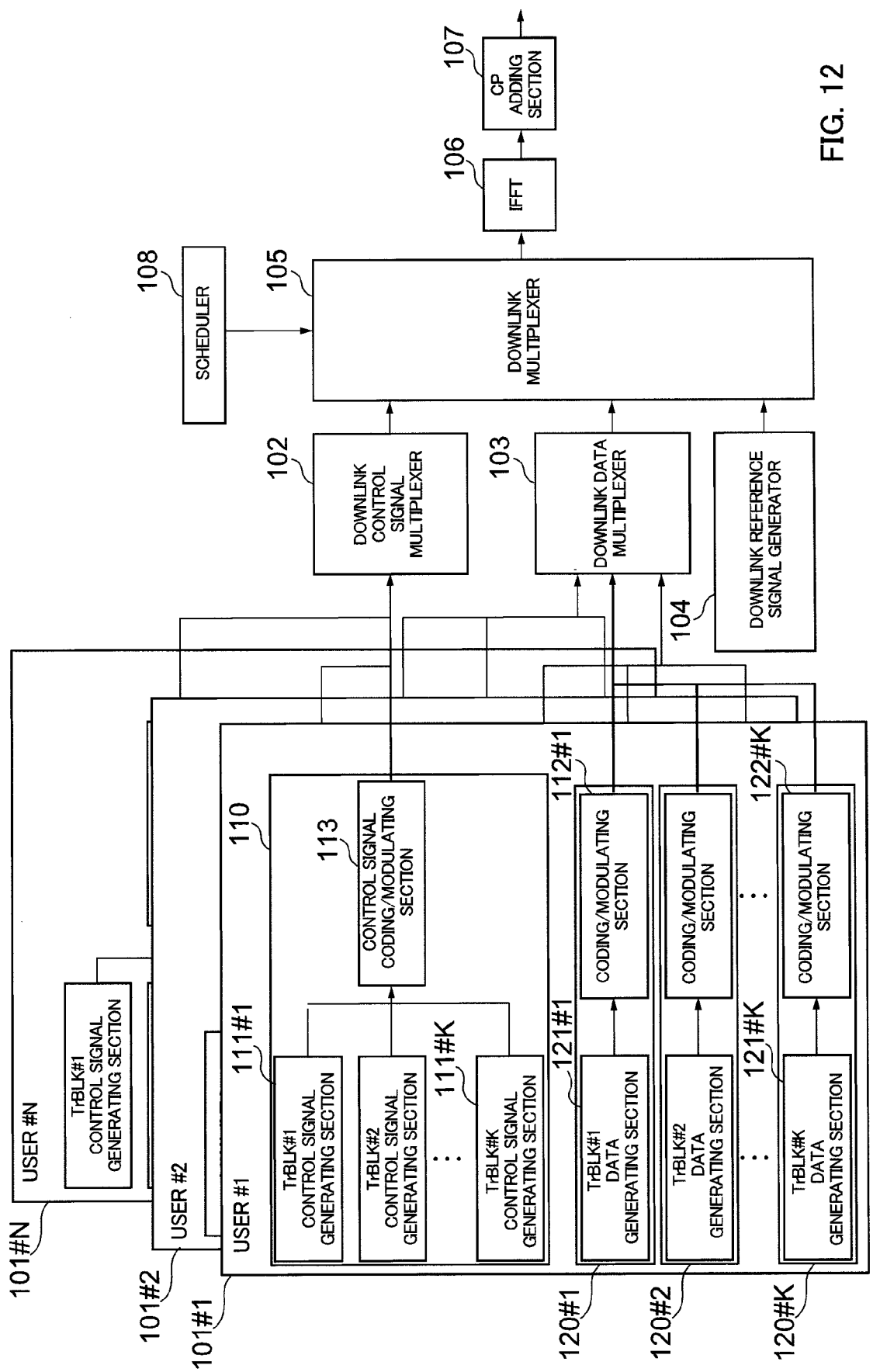
FIG. 12 is a block diagram illustrating a configuration of a transmitting unit of the base station according to the above-mentioned embodiment.

The next description is made about the configuration of a transmitting unit (baseband processing unit) in the base station according to the present embodiment. FIGS. 11 and 12 are block diagrams illustrating the configurations of the transmitting unit of the base station according to the present embodiment. In FIG. 11, the transmitting unit uses the separate coding, while in FIG. 12, the transmitting unit uses the joint coding. Here, in FIG. 12, the like parts in FIG. 11 are denoted by the like reference numerals and explanation thereof is omitted. Here, for convenience of explanation, the base station having the transmitting unit using the separate coding and the base station having the transmitting unit using the joint coding are explained separately. However, it is assumed that the transmitting unit of the base station according to the present embodiment is compatible with both of the separate coding and joint coding.

As illustrated in FIG. 11, the transmitting unit which uses the separate coding has a plurality of downlink signal generators 101 (users #1 to #N) to support plural mobile stations as communication targets, a downlink control signal multiplexer 102 for multiplexing downlink control signals generated by these downlink signal generators 101, a downlink data multiplexer 103 for multiplexing downlink shared data (data) generated by the downlink signal generators 101, a downlink reference signal generator 104 for generating a downlink reference signal, a downlink multiplexer 105 that serves as apart of the transmitting unit and is provided to multiplex information from the downlink reference signal generator 104, the downlink data multiplexer 103 and the downlink control signal multiplexer 102, an Inverse Fast Fourier Transformer (IFFT) 106, a cyclic prefix adding section (CP adding section) 107 and a scheduler 108.

The scheduler 108 determines schedule information for specifying allocation of radio resources based on the channel quality information reported from a mobile station and also determines a modulation scheme and a coding rate used in information transmission. Then, the scheduler uses the above-mentioned channel quality information as a basis to determine the above-mentioned coding method and transmitting method. Here, in determining these coding and transmitting methods, quality of service (QoS) with the mobile station may be referred to in addition to the above-mentioned channel quality information.

The downlink signal generator 101#1 has a plurality of downlink control signal generating sections 110 (110#1 to 110#K) so as to use plural transport blocks (TrBLK#1 to TrBLK#K) in information transmission and also a plurality of downlink data generating sections 120 (120#1 to 120#K) (for transport blocks TrBLK#1 to TrBLK#K). Each downlink control signal generating section 110 has a transport block control signal generating section 111 (111#1 to 111#K) and a control signal coding/modulating section 112 (112#1 to 112#K) that serves as coding section. Each downlink data generating section 120 has a transport block data generating section 121 (121#2 to 121#K) and a coding/modulating section 122 (122#1 to 122#K).

In the downlink control signal generating section 110#1, the transport block control signal generating section 111#1 uses schedule information determined by the scheduler 108 as a basis to generate a control signal (PDCCH) of a corresponding transport block. The control signal coding/modulating section 112#1 performs coding and modulating on a control signal generated by the transport block control signal generating section 111#1 in accordance with the coding method (including the coding rate) and modulating scheme specified by the scheduler 108. Here, the downlink control signal generating sections 110#2 to 110#K have the same structures as the downlink control signal generating section 110#1. In this case, the above-mentioned separate coding is realized by the control signal coding/modulating section 112#2 to 112#K performing coding on respective control signals of the corresponding transport blocks. A control signal coded and modulated by each of the control signal coding/modulating sections 112#1 to 112#K is output to the downlink control signal multiplexer 102.

In the downlink data generating section 120#1, the transport block data generating section 121#1 generates data of the corresponding transport block based on the schedule information determined by the scheduler 108 and using transmission data from an upper station apparatus (not shown). The coding/modulating section 122#1 performs coding and modulating of data generated by the transport block data generating section 121#1 in accordance with the coding and modulating scheme specified by the upper layer. Here, the downlink data generating sections 120#2 to 120#K have the same structures as the downlink data generating section 120#1. The data coded and modulated by each of the downlink data generating sections 120#1 to 120#K is output to the downlink data multiplexer 103.

The downlink signal generators 101#2 to 101#N have the same structures as the downlink signal generator 101#1. A control signal coded and modulated by the downlink control signal generating section 110 each of the downlink signal generators 101#2 to 101#N has is output to the downlink control signal multiplexer 102, like the downlink control signal generating section 110#1. Besides, the data coded and modulated by the downlink data generating section 120 each of the downlink signal generators 101#2 to 101#N has is output to the downlink data multiplexer 103, like the downlink data generating section 120#1.

The downlink control signal multiplexer 102 performs multiplexing over downlink control channels of plural users. That is, the downlink control signal multiplexer 102 multiplexes control signals received from the downlink signal generators 101#1 to 101#N. The thus-multiplexed control signal is output to the downlink multiplexer 105.

The downlink data multiplexer 103 performs multiplexing over the downlink data channels of plural users. That is, the downlink data multiplexer 103 multiplexes data received from the downlink signal generators 101#1 to 101#N. The thus-multiplexed data is output to the downlink multiplexer 105.

The downlink reference signal generator 104 generates a reference signal that is transmitted with known transmission power and phase at the mobile station and used in measuring a state of radio communication channel for synchronous detection, radio link control, scheduling, cell search, handover and the like.

The downlink multiplexer 105 performs multiplexing of the control signal, data and reference signal received from the downlink control signal multiplexer 102, the downlink data multiplexer 103 and the downlink reference signal generator 104 and allocates it to the component carriers. In this case, the downlink multiplexer 105 maps the control signal (PDCCH) from the downlink control signal multiplexer 102 to a sub-carrier of a corresponding component carrier based on the transmitting method designated by the scheduler 108 or pre-designated transmitting method. Thus, as the control signals from the downlink signal generators 101#1 to 101#N are mapped based on the transmitting method designated by the upper layer, the plural transmitting methods illustrated in FIG. 2 can be realized.

The transmission data mapped by the downlink multiplexer 105 is subjected to Inverse Fast Fourier Transform at the Inverse Fast Fourier Transformer 106 and transformed from a frequency range signal to a time-series signal. Then, the signal is added with a cyclic prefix at the cyclic prefix adding section (CP adding section) 107. This cyclic prefix is a guide interval for absorbing a difference due to multipath transmission delay. The transmission data with this cyclic prefix added is output to a transmitting/receiving section (not shown) and sent to a mobile station on the downlink.

Meanwhile, as illustrated in FIG. 12, the transmitting unit using the joint coding is different from the transmitting unit using the separate coding in the structure of the downlink control signal generating section 110 of the downlink signal generator 101. That is, in the transmitting unit using the joint coding, the downlink control signal generating section 110 has a single control signal coding/generating section 113 that performs coding and modulating of control signals generated by all transport block control signal generating sections 111#1 to 111#K, which is different from the transmitting unit using the separate coding.

This control signal coding/modulating section 113 servers as coding section and codes and modulates control signals that are generated by the transport block control signal generating sections 111#1 to 111#K in accordance with the modulating scheme and the coding method (including the coding rate) designated by the scheduler 108. In this case, the above-mentioned joint coding is realized by the control signal coding/modulating section 113 performing joint coding of the control signals generated by the transport block control signal generating sections 111#1 to 111#K. Thus, the control signal coded and modulated by the control signal coding/modulating section 113 is output to the downlink control signal multiplexer 102.

The downlink control signal multiplexer 102 multiplexes control signals received the control signal coding/modulating sections 113 of the downlink signal generators 101#1 to 101#N. The downlink data multiplexer 103 multiplexes data received from the downlink signal generators 101#1 to 101#N. The downlink multiplexer 105 multiplexes the control signal, data and reference signal received from the downlink control signal multiplexer 102, the downlink data multiplexer 103 and the downlink reference signal generator 104, respectively, and allocates it to the component carriers. In this case, the downlink multiplexer 105 uses the transmitting method designated by the scheduler 108 or the pre-designated transmitting method as a basis to map the control signal (PDCCH) from the downlink control signal multiplexer 102 to a sub-carrier of a corresponding component carrier. Thus, the control signals from the downlink signal generators 101#1 to 101#N are mapped based on the transmitting method designated by the upper layer thereby to be able to realize the plural transmitting methods shown in FIG. 2.

Figure 13:
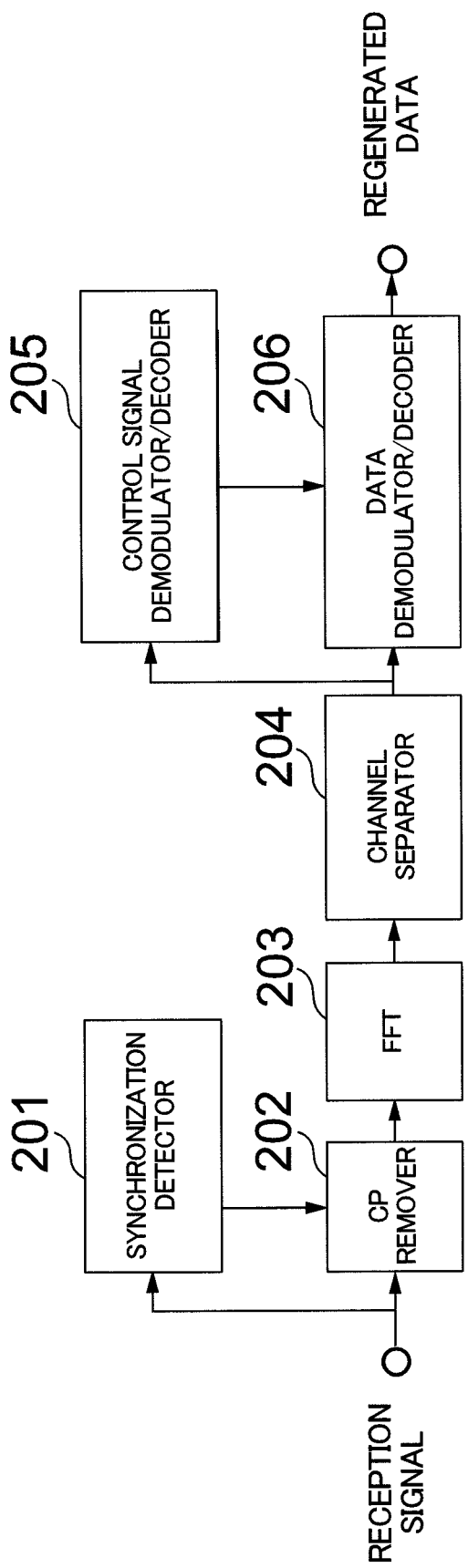
FIG. 13 is a block diagram illustrating a configuration of a receiving unit of the base station according to the above-mentioned embodiment.

Next description is made about the structure of a receiving unit (baseband processing unit) of the mobile station according to the present embodiment. FIG. 13 is a block diagram illustrating the configuration of the receiving unit of the mobile station according to the present embodiment. In FIG. 13, the receiving unit is configured to receive transmission data having a separate-coded or joint-coded control signal (PDCCH). As illustrated in FIG. 13, the receiving unit of the mobile station is configured to have a synchronization detector 201, a cyclic prefix remover (CP remover) 202, a Fast Fourier Transformer (FFT) 203, a channel separator 204 that serves as control signal separating section, a control signal demodulator/decoder 205 that serves as decoding section and a data demodulator/decoder 206.

A reception signal received at a transmitting/receiving section (not shown) from the base station is input to the synchronization detector 201 and the CP remover 202. The synchronization detector 201 detects synchronization based on a reference signal contained in the reception signal and outputs a detection result to the CP remover 202. The CP remover 202 removes a cyclic prefix from the reception signal in accordance with the synchronization detection result and outputs it to the FFT 203. The FFT 203 performs Fast Fourier Transform on the reception signal, from which the cyclic prefix is removed, to transform the time-series signal to a frequency range signal and outputs it to the channel separator 204. The channel separator 204 receives the transformed frequency range signal to separate it to the control signal and a shared channel signal (data signal), and outputs them to the control signal demodulator/decoder 205 and the data demodulator/decoder 206.

The control signal demodulator/decoder 205 demodulates a control signal contained in the control channel signal, decodes it and obtains control information contained therein. In this case, the control signal demodulator/decoder 205 performs demodulation and decoding of the control signal based on the coding method in the base station designated by the scheduler 108 or the coding method in the base station recognized in advance. For example, when the control signal (PDCCH) is subjected to the separate coding in the base station, it demodulates the control information assigned to each component carrier and decodes it thereby to obtain the control information contained therein. On the other hand, when the control information is subjected to the joint coding in the base station, it demodulates the control signal (PDCCH) that includes control signals jointly coded in association with the plural component carriers and decodes it thereby to obtain the control information contained therein. Particularly, if the control signal is subjected to the two-step coding in the base station, first, the above-described second PDCCH or fourth PDCCH is demodulated, and then, the above-described first or third PDCCH is demodulated and decoded. The demodulated and decoded control information is output to the data demodulator/decoder 206.

The data demodulator/decoder 206 demodulates and decodes the reception data contained in the shared channel signal (data signal) in accordance with the control information received from the control signal demodulator/decoder 205. In this case, the data demodulator/decoder 206 uses the resource allocation information contained in the control information as a basis to specify a transport block corresponding to the component carrier assigned to the apparatus itself, and demodulates and decodes corresponding reception data thereby to obtain regenerated data.

Here, in the mobile communication system according to the present embodiment, difference in the number of control bits between the separate coding and the joint coding of PDCCHs is described by way of example. FIG. 14(*a*) is a view illustrating an example of the number of control bits of PDCCH in the separate coding in the mobile communication system according to the present embodiment and FIG. 14(*b*) is a view illustrating an example of the number of control bits of PDCCH in the joint coding. For convenience of explanation, the following description is made using the number of control bits required for resource block assignment and CRC (Cyclic Redundancy Check) illustrated in FIGS. 14(*a*) and 14(*b*).

As illustrated in FIG. 14(*a*), in the separate coding, the number of control bits required for resource block assignment and CRC increases in direct proportion to the number of transport blocks. In other words, in the former, 25 bits are required per transport block and 125 bits are required for five transport blocks. In the latter, 16 bits are required per transport block and 80 bits are required for five transport blocks. Here, the number of control bits illustrated in FIG. 14(*a*) is such that the PDCCH is subjected to the one-step coding. If the PDCCH is subjected to the two-step coding, control bits required for the above-described second PDCCH are added.

On the other hand, in the joint coding, as illustrated in FIG. 14(*b*), control information required for the resource block assignment can be designated jointly, not per transport block. Accordingly, the number of control bits can be reduced as compared with that in the separate coding. For example, the number can be reduced to 65 bits for five transport blocks. Besides, the control information required for CRC can be also designated jointly, not per transport block, and therefore, a fixed number of bits (16 bits) is used to be able to specify the control information. Here, the number of control bits illustrated in FIG. 14(*b*) is such that the PDCCH is subjected to the one-step coding with a variable size (one-step B in FIG. 6). If the PDCCH is subjected to the one-step coding with a fixed size (one-step A in FIG. 6), the number of control bits is set in accordance with the number of transport blocks corresponding to the component carriers contained in the system band. That is, if the system band is made up of four component carriers, the number of control bits is set in accordance with the four transport blocks.

As described up to this point, according to the mobile communication system according to the present embodiment, the base station codes control signals (PDCCHs) of transport blocks corresponding to plural component carriers jointly (joint coding) and assigns the coded control signal (PDCCH) to one or plural component carriers to transmit it on the downlink. Then, the mobile station receives the reception data from the base station, separates the control signal from the reception data, and decodes the separated control signal thereby to obtain control information of transport blocks corresponding to the plural component carriers. With this structure, as the information amount of the control signals for the plural transport blocks (the number of control bits required for CRC, for example) can be reduced, the control signals can be transmitted efficiently even in radio communication over a system band containing plural component carriers.

Particularly, according to the mobile communication system according to the present embodiment, the jointly-coded control signal (PDCCH) can be assigned to a specific one component carrier (primary carrier) and transmitted (Nos. 3 to 5 in FIG. 6). In this case, the control information of plural transport blocks can be obtained only by demodulating the signal assigned to the specific single component carrier, the processing of obtaining control information in the mobile station can be simplified.

Further, according to the mobile communication system according to the present embodiment, the jointly-coded control signal (PDCCH) can be assigned to all component carriers that make up the system band and transmitted (Nos. 6 to 8 in FIG. 6). In this case, the frequency diversity effect can be obtained in transmission of the PDCCH, thereby improving the reception quality in the mobile station.

Furthermore, according to the mobile communication system according to the present embodiment, the jointly-coded control signal (PDCCH) can be assigned to specific plural component carriers (primary carriers) to be transmitted (Nos. 9 to 11 in FIG. 6). In this case, the control information of plural transport blocks can be obtained only by demodulating the signals assigned to the specific plural component carriers, the processing of obtaining control information in the mobile station can be simplified. Besides, the frequency diversity effect can be obtained in transmission of the PDCCH, thereby improving the reception quality in the mobile station.

The present invention is not limited to the above-described embodiment and may be embodied in various modified forms. For example, in the above-described embodiment, the shared data is interleaved at the transmission side and transmitted and then, interleaved at the reception side. This is not intended for limiting the present invention. The present invention may be also applied to the case where the common data is not interleaved. In addition, the above-mentioned data block assignment pattern, number of processing parts, processing procedure, number of component carriers, number of data blocks and data block range may be changed appropriately without departing from scope of the present invention. Other parts may be also modified if necessary without departing from the scope of the present invention.

The present specification is based on Japanese Patent Applications No. 2009-023091 filed on Feb. 3, 2009, the entire contents of which are expressly incorporated by reference herein.

The invention claimed is:

1. A radio base station apparatus connected to a mobile communication system that performs radio communications by using a plurality of component carriers that is a system band of the LTE system, the radio base station apparatus comprising:
    coding section configured to code control signals regarding transport blocks corresponding to a plurality of component carriers jointly; and
    transmitting section configured to assign a coded control signal coded by the coding section to one or plural component carriers and to transmit the coded control signal on downlink,
    wherein the coded control signal coded by the coding section is a variable-size signal by joint coding in accordance with a number of transport blocks assigned to a mobile terminal apparatus as a communication target and the coding section codes the control signals including information for specifying a size of the variable-size signal for two-step coding.

2. The radio base station apparatus according to claim 1, wherein the transmitting section assigns the coded control signal to a specific single component carrier.

3. The radio base station apparatus according to claim 1, wherein the transmitting section assigns the coded control signal to all of the component carriers that make up a system band of which bandwidth can be set to 100 MHz and a central frequency can be set to 50 MHz.

4. The radio base station apparatus according to claim 1, wherein the transmitting section assigns the coded control signal to specific plural component carriers.

5. A mobile terminal apparatus connected to a mobile communication system that performs radio communications by using a plurality of component carriers that is a system band of the LTE system, the mobile terminal apparatus comprising:
    control signal separating section configured to separate the control signal from reception data received from the radio base station apparatus according to claim 1; and
    decoding section configured to decode the control signal to obtain control information of transport blocks corresponding to a plurality of component carriers.

6. The mobile terminal apparatus according to claim 5, wherein the decoding section decodes the control signal separated by the control signal separating section thereby to obtain the control information of the transport blocks corresponding to the respective component carriers.

7. A radio communication method for a mobile communication system that performs radio communications by using a plurality of component carriers that is a system band of the LTE system, the radio communication method comprising:
    in a radio base station apparatus, coding control signals of transport blocks corresponding to a plurality of component carriers jointly;
    assigning a coded control signal to one or plural component carriers and transmitting the coded control signal;
    in a mobile terminal apparatus, separating the coded control signal from reception data received from the radio base station apparatus; and
    decoding the coded control signal to obtain control information of the transport blocks corresponding to the component carriers,
    wherein the coding step includes the coded control signal coded by the coding section is a variable-size signal by joint coding in accordance with a number of transport blocks assigned to a mobile terminal apparatus as a communication target and the coding section codes the control signals including information for specifying a size of the variable-size signal for two-step coding.

8. The radio communication method according to claim 7, wherein in the radio base station apparatus, each of the control signals of the transport blocks of the component carriers that make up a system band is coded on a component carrier-by-component carrier basis, and in the mobile terminal apparatus, the coded control signal is separated from the reception data received from the radio base station apparatus and the coded control signal is decoded to obtain the control information of the transport blocks corresponding to the respective component carriers.

* * * * *